Oct. 7, 1924.

J. NUTRY 1,510,631

EXTENSION DEVICE FOR BREATHER PIPES

Filed June 11, 1921

Inventor
John Nutry
By his Attorney

Patented Oct. 7, 1924.

1,510,631

UNITED STATES PATENT OFFICE.

JOHN NUTRY, OF RIDGEWOOD, NEW JERSEY.

EXTENSION DEVICE FOR BREATHER PIPES.

Application filed June 11, 1921. Serial No. 476,852.

*To all whom it may concern:*

Be it known that I, JOHN NUTRY, a citizen of the United States, residing at Ridgewood, in the county of Bergen and State of New Jersey, have invented certain new and useful Improvements in Extension Devices for Breather Pipes, of which the following is a specification.

This invention relates to an extension device for breather pipes of automobile and like engines, and an object of the invention is to provide such a device which may be used particularly as a sort of funnel thru which oil may be readily introduced into the crank case of the engine.

A further object is to provide an extension device made up of several parts telescopically associated with each other and adapted to be readily moved into and out of extended position at will, thus placing the device when not in use away from possible interference with other elements of mechanism, and yet leaving it ready to be extended for service upon occasion.

A further object is to provide means whereby the several telescopically arranged parts may be positively and efficiently held in either extended or collapsed condition.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

Figure 1:
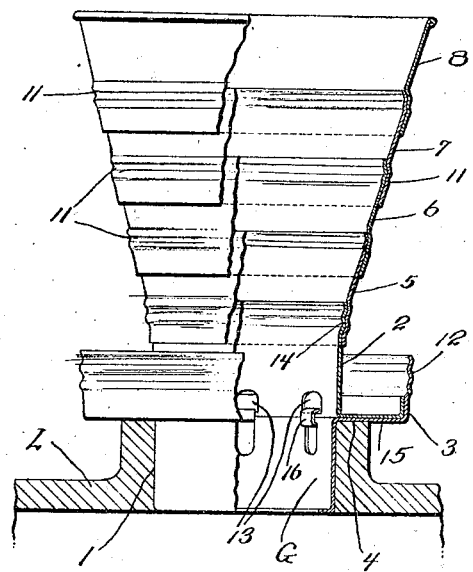
Figure 2:
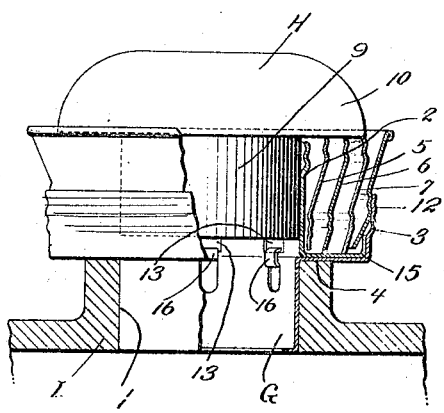

In the accompanying drawings which are to be taken as a part of this specification, and in which I have shown merely a preferred form of embodiment of the invention:

Figure 1 is a side elevational view of a device constructed in accordance with this invention, and illustrating the same in position of use; that is, with its several sections extended, a portion of the view being shown in vertical section for better disclosing detail construction, and Figure 2 is a similar view showing the parts as they appear when collapsed.

Referring to the drawings for describing in detail the structure which is illustrated therein, the reference character L indicates a portion of the crank case of an engine, or other device, or part, to which the invention may be readily applied, said part having an opening, as 1, therein into which is fitted what may be termed the base member G of the present device. This base member comprises essentially a tube which extends into the opening 1 and which has a saucer-shaped flange 3 carried thereby serving to abut against a portion of the part L, as at 4, for limiting movement of the base member into the opening 1.

Telescopically fitting about the upper portion 14 of the base member is a sleeve 5. Similarly fitting about the sleeve 5 is a sleeve 6. A further sleeve 7 fits in the same manner about sleeve 6, and a final sleeve 8 likewise fits about sleeve 7. The sleeves 5 to 8 are progressively increased in diameter and all are tapered after the manner of an ordinary collapsible drinking cup, the several sections being capable of being moved into extended or collapsed condition at will, being adapted when extended to form a funnel-shaped extension continuing upwardly from the base member G, as in Fig. 1, and being adapted, when collapsed, to nest within the saucer-shaped flange 3 and about the upper portion of the base member, as in Fig. 2.

A detachable cover H is provided adapted to fit into and suitably close the upper end 14 of the base member when the parts are collapsed, said cover having a depending portion 9 for extending into the base member and having a top flange, or hood-like, portion 10 extending over the upper edges of the collapsed sections 5, 6 and 7 serving to hold said sections in a substantially fixed position within the saucer 3.

In order to insure that the several sections, when distended, will not be accidentally moved to collapsed condition, it is desirable that some form of interlocking means may be provided. For this purpose the drawings herewith illustrate the sections to be provided with cooperative thread portions 11 so arranged that when the parts have reached approximately their extended positions a slight rotation will cause them to become interlocked. Counter rotation will again move them to position for being collapsed.

When the parts are collapsed the section 8 preferably engages directly with the flange portion 12 of the saucer 3 which is suitably threaded to receive it, as illustrated.

It is particularly to be noted that the saucer 3 serves not only to receive the several sections 5 to 8, as in Fig. 2, but also that it serves the further very important function of catching any drip from the extended sections. Suitable openings 13 communicate from the interior of the saucer into the interior of the base member so that this drip is conducted into the interior of part L, thus insuring that all of the oil, or other liquid, introduced into the upper end of the device will pass into the member L. In this connection it is further particularly noted that the base member 2 is made up of an upper portion 14 and a lower portion 15, and that the saucer 3 is made as an integral part of the lower portion, the upper portion being connected to the lower portion by tangs 16 which extend thru the openings 13. No joints thus occur thru which oil, or other liquid, could be discharged from the saucer except thru the openings 13.

It is further to be noted that when the parts of this device are in their normal or collapsed position, and the cover H is applied, as in Fig. 2, all of the parts are held firmly together against the probability of rattling and yet suitable breather air passages are left through the openings 13 to facilitate the so-called "breathing" of the engine. The sections 5, 6, and 7 at this time serve as a guard for the openings 13 and provide a more or less tortuous passage for air to and from the openings 13 thus preventing the probability of dirt and dust entering said openings.

Having thus described my invention, what I claim as new and desire to secure by Letters Patent is:—

1. A device of the class described, comprising a base member, a plurality of extension sections telescopically collapsibly engaging said base member, drip catching means carried by said base member, and said base member having openings therethru communicating between said drip catching means and the interior of the base member.

2. A device of the class described comprising a tubular base member adapted to be connected with a suitable support, a plurality of extension sections telescopically collapsibly connected together and to said base member, said sections and base member being provided with thread formations by which to hold said sections in distended condition, and said base member being also provided with a thread formation to be engaged by one of said sections to hold said section in collapsed position.

3. A device of the class described comprising a tubular base member adapted to be connected with a suitable support, a plurality of extension sections telescopically collapsibly connected together and to said base member, said sections and base member having thread formations operable when the sections are distended to hold said sections against collapse and when the sections are collapsed to hold at least one of said sections in its collapsed position.

4. A device of the class described comprising a tubular base member adapted to be connected with a suitable support, a plurality of extension sections telescopically collapsibly connected together and to said base member, and a separately formed cover member adapted to engage within the bore of the base member and having a part for engaging at least some of said sections to hold said sections in collapsed position.

5. A device of the class described comprising a tubular base member adapted to be connected with a suitable support, a plurality of extension sections telescopically collapsibly connected together and to said base member, interengaging formations provided upon the base member and one of said sections to hold the mentioned section against unintentional movement when in collapsed position, and a separately formed cover member having a part to engage the base member and having another part to engage the remaining sections when said sections are collapsed to hold them in their collapsed position.

6. A device of the class described comprising a plurality of separate sections telescopically collapsibly connected together, said sections being shaped so that when in distended condition they provide a suitably extended receptacle for use in the manner set forth, a separately formed cover member for over-lying at least some of said sections when said sections are collapsed, one of said sections having a breather opening therethrough, and others of said sections being disposed when in collapsed position to cooperate with said cover member to provide a guard for said breather opening.

7. A device of the class described comprising a plurality of separate sections telescopically collapsibly connected together, said sections being shaped so that when in distended condition they provide a suitably extended receptacle for use in the manner set forth, the lowermost of said sections having a downwardly projecting extension by which it may be connected with an engine body or the like, said lowermost section and its extension having a central opening therethrough, and a cover member adapted when the sections are collapsed to be inserted as a plug into said opening and having a part to engage and hold at least some of said sections in collapsed position.

8. A device of the class described comprising a plurality of separate sections telescopically collapsibly connected together, said sections being shaped so that when in distended condition they provide a suitably extended receptacle for use in the manner set forth, the lowermost of said sections having a downwardly projecting extension by which it may be connected with an engine body or the like, said lowermost section and its extension having a central opening therethrough, and a cover member adapted when the sections are collapsed to be inserted as a plug into said opening and having a part to engage and hold at least some of said sections in collapsed position, and said lowermost section having a breather opening therethrough communicating with said central opening and always unobstructed by said cover part.

9. A device of the class described comprising a plurality of separate sections telescopically collapsibly connected together, said sections being shaped so that when in distended condition they provide a suitably extended receptacle for use in the manner set forth, the lowermost of said sections having a downwardly projecting extension by which it may be connected with an engine body or the like, said lowermost section and its extension having a central opening therethrough, said lowermost section having a cupped extension laterally thereof serving as a drip catching means with respect to the other sections, and there being a passage provided to conduct the drip caught by said cupped extension into said central opening.

10. A device of the class described comprising a funnel-shaped member made up of a plurality of extension sections telescopically collapsibly connected together, and drip catching means at the base of said sections having a hollow tubular downward extension in communication therewith for the purpose set forth.

11. A device of the class described comprising a base member, a plurality of extension sections telescopically collapsibly engaging each other and said base member, drip catching means formed as a part of said base member, and a hollow tubular downward extension continuing from said base member by which to connect the device to an engine body or the like and by which to conduct drip away from said drip catching means.

In testimony whereof I affix my signature in the presence of two witnesses.

JOHN NUTRY.

Witnesses:
L. GESSFORD HANDY,
MAY SCHULZ.